US012539283B1

(12) United States Patent
Xiao et al.

(10) Patent No.: US 12,539,283 B1
(45) Date of Patent: Feb. 3, 2026

(54) EPINEPHRINE LIQUID FORMULATIONS

(71) Applicant: Fresenius Kabi USA, LLC, Lake Zurich, IL (US)

(72) Inventors: Chaoju Xiao, Melrose Park, IL (US); Karen Liu, Melrose Park, IL (US)

(73) Assignee: FRESENIUS KABI USA, LLC, Lake Zurich, IL (US)

( * ) Notice: Subject to any disclaimer, the term of this patent is extended or adjusted under 35 U.S.C. 154(b) by 0 days.

(21) Appl. No.: 19/029,026

(22) Filed: Jan. 17, 2025

Related U.S. Application Data

(60) Provisional application No. 63/729,064, filed on Dec. 6, 2024.

(51) Int. Cl.
*A61K 31/137* (2006.01)
*A61K 9/08* (2006.01)
*A61K 47/02* (2006.01)
*A61K 47/12* (2006.01)
*A61K 47/14* (2017.01)

(52) U.S. Cl.
CPC .............. *A61K 31/137* (2013.01); *A61K 9/08* (2013.01); *A61K 47/02* (2013.01); *A61K 47/12* (2013.01); *A61K 47/14* (2013.01)

(58) Field of Classification Search
CPC ........ A61K 31/137; A61K 9/08; A61K 47/02; A61K 47/12; A61K 47/14
See application file for complete search history.

(56) References Cited

U.S. PATENT DOCUMENTS

| | | |
|---|---|---|
| 5,783,269 A | 7/1998 | Heilmann et al. |
| 7,828,787 B2 | 11/2010 | Brandenburger et al. |
| 7,875,016 B2 | 1/2011 | Pahlberg et al. |
| 8,118,802 B2 | 2/2012 | Brandenburger et al. |
| 8,162,915 B2 | 4/2012 | Brandenburger et al. |
| 9,119,876 B1 | 9/2015 | Kannan et al. |
| 9,283,197 B1 | 3/2016 | Taneja |
| 9,295,657 B1 | 3/2016 | Kannan et al. |
| 9,433,589 B2 | 9/2016 | Hansen et al. |
| 10,004,700 B1 | 6/2018 | Taneja |
| 10,039,728 B1 | 8/2018 | Taneja |
| 10,130,592 B2 | 11/2018 | Kannan et al. |
| 10,624,864 B2 | 4/2020 | Sanghvi et al. |
| 10,653,646 B2 | 5/2020 | Akasapu et al. |
| 10,952,962 B1 * | 3/2021 | Leeah ................... A61K 31/137 |
| 11,083,698 B2 | 8/2021 | Akasapu et al. |
| 11,207,280 B2 | 12/2021 | Akasapu et al. |
| 11,234,925 B2 | 2/2022 | Rana et al. |
| 11,266,611 B2 | 3/2022 | Rubin |
| 11,337,938 B2 | 5/2022 | Sanghvi et al. |
| 11,925,608 B2 | 3/2024 | Surakitbanharn |
| 12,133,837 B2 | 11/2024 | Akasapu et al. |
| 12,280,024 B2 | 4/2025 | Sanghvi et al. |
| 12,290,493 B2 | 5/2025 | Rubin |
| 12,310,930 B2 | 5/2025 | Surakitbanharn |
| 2006/0240204 A1 | 10/2006 | Ling et al. |
| 2008/0269347 A1 * | 10/2008 | Bruss ................... A61K 31/135 514/653 |
| 2015/0273133 A1 | 10/2015 | Kerschbaumer et al. |
| 2018/0333374 A1 | 11/2018 | Taneja |
| 2019/0151202 A1 | 5/2019 | Jobstl et al. |
| 2021/0154157 A1 | 5/2021 | Surakitbanharn |
| 2021/0205238 A1 | 7/2021 | Augustin et al. |
| 2021/0353531 A1 | 11/2021 | Rana et al. |
| 2022/0016054 A1 * | 1/2022 | Shah ..................... A61K 47/02 |
| 2022/0110891 A1 | 4/2022 | Akasapu et al. |
| 2023/0076626 A1 * | 3/2023 | Zhang ................. A61K 31/137 |
| 2023/0100523 A1 | 3/2023 | Sanghvi et al. |
| 2023/0137790 A1 | 5/2023 | Zhang et al. |
| 2023/0140033 A1 | 5/2023 | Zhang et al. |
| 2023/0210722 A1 | 7/2023 | Thakker et al. |
| 2023/0225994 A1 | 7/2023 | Howard et al. |
| 2023/0257183 A1 | 8/2023 | Puri et al. |
| 2023/0285326 A1 | 9/2023 | Patil et al. |
| 2024/0197653 A1 | 6/2024 | Akasapu et al. |
| 2025/0120923 A1 | 4/2025 | Akasapu et al. |

FOREIGN PATENT DOCUMENTS

| | | |
|---|---|---|
| WO | 2014127015 A1 | 8/2014 |
| WO | 2014127018 A1 | 8/2014 |
| WO | 2014127020 A1 | 8/2014 |
| WO | 2017218918 A1 | 12/2017 |

(Continued)

OTHER PUBLICATIONS

ADRENACLICK® (epinephrine injection), for Intramuscular or Subcutaneous Use, CII, Hospira, Lake Forest, IL, Highlights of Prescribing Information, U.S. Food and Drug Administration, Silver Spring, Maryland, Reference ID 4741739 (Feb. 2021)—35 pgs. Downloaded from the internet https://www.accessdata.fda.gov/drugsatfda_docs/label/2021/020800s040lbl.pdf (no download date available).

Epinephrine in Sodium Chloride Injection, for intravenous use, Par Pharmaceutical, Chestnut Ridge, New York, USA, Highlights of Prescribing Information, U.S. Food and Drug Administration, Silver Spring, Maryland, Reference ID 5162006 (Apr. 2023)—11 pgs. Downloaded from the internet https://www.accessdata.fda.gov/drugsatfda_docs/label/2023/215875s000lbl.pdf (no download date available).

(Continued)

*Primary Examiner* — Robert A Wax
*Assistant Examiner* — Olga V. Tcherkasskaya
(74) *Attorney, Agent, or Firm* — Leydig, Voit & Mayer, Ltd.

(57) ABSTRACT

The invention provides a stable, pharmaceutical formulation comprising epinephrine or a pharmaceutically acceptable salt thereof. The formulation includes an organic acid, a tonicity agent, and water, has a pH of about 3.0 to about 3.6, and is substantially free of a conjugate base of the organic acid.

23 Claims, No Drawings

(56) References Cited

FOREIGN PATENT DOCUMENTS

| | | |
|---|---|---|
| WO | 2019162892 A1 | 8/2019 |
| WO | WO 2025/248546 A1 | 12/2025 |

OTHER PUBLICATIONS

Adrenalin (epinephrine injection) 1 mg/mL (1:1000) for intramuscular, subcutaneous, and intraocular use, JHP Pharmaceuticals, LLC, Parsippany, New Jersey, USA, Highlights of Prescribing Information, U.S. Food and Drug Administration, Silver Spring, Maryland, Reference ID 3227792 (Dec. 2012)—10 pgs. Downloaded from the internet https://www.accessdata.fda.gov/drugsatfda_docs/label/2012/204200s000lbl.pdf (no download date available).

Adrenalin (epinephrine injection) 1 mg/mL (1:1000), for intramuscular and subcutaneous use, Par Pharmaceutical Companies, Inc., Woodcliff Lake, New Jersey, USA, Highlights of Prescribing Information, U.S. Food and Drug Administration, Silver Spring, Maryland, Reference ID 3984055 (Sep. 2016)—11 pgs. Downloaded from the internet https://www.accessdata.fda.gov/drugsatfda_docs/label/2016/204200Orig1s004lbl.pdf.

Adrenalin (epinephrine injection) 1 mg/ml (1:1000) 1mL vial: for intramuscular, subcutaneous, and intraocular use 30 mL vial: for intramuscular and subcutaneous use, Par Pharmaceutical Companies, Inc., Woodcliff Lake, New Jersey, USA, Highlights of Prescribing Information, U.S. Food and Drug Administration, Silver Spring, Maryland, Reference ID 3932719 (May 2016)—11 pgs. Downloaded from the internet https://www.accessdata.fda.gov/drugsatfda_docs/.

AUVI-Q® (epinephrine injection, USP), for intramuscular or subcutaneous use, Kaléo, Inc., Richmond, Virginia, USA, Highlights of Prescribing Information, U.S. Food and Drug Administration, Silver Spring, Maryland, Reference ID 5337535 (Feb. 2024)—25 pgs. Downloaded from the internet https://www.accessdata.fda.gov/drugsatfda_docs/label/2024/201739s028lbl.pdf (no download date available).

Epinephrine Injection USP, 1 mg/ml (1:1,000) ampule for IV infusion, Belcher Pharmaceuticals, LLC, Largo, Florida, USA, Highlights of Prescribing Information, U.S. Food and Drug Administration, Silver Spring, Maryland (Jul. 2014)—8 pgs. Downloaded from the internet https://www.accessdata.fda.gov/drugsatfda_docs/label/2014/205029s000lbl.pdf (no download date available).

Epinephrine Injection, USP 10 mg/10 mL (1 mg/mL) Multiple Dose Vial, for intravenous, intramuscular, subcutaneous use, Belcher Pharmaceuticals, LLC, Largo, Florida, USA, Highlights of Prescribing Information, U.S. Food and Drug Administration, Silver Spring, Maryland (Jan. 2022)—16 pgs. Downloaded from the internet https://www.accessdata.fda.gov/drugsatfda_docs/label/2023/205029Orig1s009lbl.pdf.

Epinephrine Injection, USP for intravenous, intramuscular and subcutaneous use only, BPI Labs, LLC, Largo, Florida, USA, Highlights of Prescribing Information, U.S. Food and Drug Administration, Silver Spring, Maryland (Feb. 2024)—43 pgs. Downloaded from the internet https://www.accessdata.fda.gov/drugsatfda_docs/label/2024/205029Orig1s013Correctedlbl.pdf (no download date available).

Epinephrine Injection USP, 1 mg/ml Syringe, for intravenous use, BPI Labs, LLC, Largo, Florida, USA, Highlights of Prescribing Information, U.S. Food and Drug Administration, Silver Spring, Maryland (May 2023)—10 pgs. Downloaded from the internet https://www.accessdata.fda.gov/drugsatfda_docs/label/2023/205029s010lbl.pdf (no download date available).

EPIPEN® (epinephrine injection), for intramuscular or subcutaneous use, EPIPEN Jr® (epinephrine injection), for intramuscular or subcutaneous use, Mylan Specialty L.P., Cannonsburg, Pennsylvania, USA, Highlights of Prescribing Information, U.S. Food and Drug Administration, Silver Spring, Maryland, Reference ID 5124446 (Feb. 2023)—56 pgs. Downloaded from the internet https://www.accessdata.fda.gov/drugsatfda_docs/label/2023/019430Orig1s106Lbl.pdf (no download date available).

Epinephrine—epinephrine injection, solution, concentrate, Fresenius Kabi USA, LLC, Lake Zurich, Illinois, USA, Highlights of Prescribing Information, U.S. Food and Drug Administration, Silver Spring, Maryland (Mar. 2024)—19 pgs. Downloaded from the internet https://dailymed.nlm.nih.gov/dailymed/getFile.cfm?setid=a6afb9e8-1db9-480c-8d31-58c5c870ca49&type=pdf (no download date available).

Epinephrine—epinephrine injection, solution, concentrate, Fresenius Kabi USA, LLC, Lake Zurich, Illinois, USA, Highlights of Prescribing Information, U.S. Food and Drug Administration, Silver Spring, Maryland (Mar. 2025)—17 pgs. Downloaded from the internet https://dailymed.nlm.nih.gov/dailymed/drugInfo.cfm?setid=4f83895f-638c-4515-af03-7c41ae60a42e (no download date available).

* cited by examiner

EPINEPHRINE LIQUID FORMULATIONS

CROSS-REFERENCE TO RELATED APPLICATIONS

This patent application claims the benefit of U.S. Provisional Application No. 63/729,064, filed Dec. 6, 2024, which is incorporated herein by reference in its entirety for all purposes.

BACKGROUND OF THE INVENTION

Epinephrine is a phenylethamine and catecholamine that functions in the body as a neurotransmitter and a hormone. In the brain, epinephrine increases arousal, enhances memory, and focuses attention while also increasing restlessness and anxiety. Elsewhere in the body, epinephrine increases heart rate and blood pressure, triggers glucose release from energy stores, increases blood flow to skeletal muscle, relaxes bronchial smooth muscle and dilates the bronchi.

Epinephrine also is referred to as adrenalin, adrenaline, L-adrenaline, (−)-adrenaline, L-epinephrine, R-epinephrine, (−)-epinephrine, (−)-(L)-epinephrine, (−)-(R)-epinephrine, 4-[(11?)-1-hydroxy-2-(methylamino)ethyl]benzene-1,2-diol, and L-1-(3,4-dihydroxyphenyl)-2-methylaminoethanol. Epinephrine has a molecular weight of approximately 183.20 and the following chemical structure:

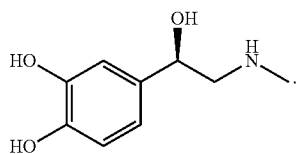

Injectable formulations of epinephrine, or a pharmaceutically acceptable salt thereof, are used for the treatment of critically low blood pressure, or hypotension, anaphylaxis, and induction and maintenance of mydriasis. The product marketed under the trademark ADRENALIN™ (epinephrine) injection was approved in the United States in December 2012 under New Drug Application (NDA) 204200 packaged as a 1 mL sterile aqueous solution in a 3 mL clear glass vial containing 1 mg/mL of epinephrine base, 9.0 mg/mL sodium chloride for isotonicity, 1.0 mg/mL sodium metabisulfite as an antioxidant, and having a pH of 2.2 to 5.0. The prescribing information for ADRENALIN™ (epinephrine) injection states that the product is administered undiluted for treatment of anaphylaxis. For induction and maintenance of mydriasis it must be diluted before use, as follows. Dilute 1 mL of ADRENALIN™ 1 mg/mL (1:1000) in 100 to 1000 mL of an ophthalmic irrigation fluid to create an epinephrine concentration of 1:100,000 to 1:1,000,000 (10 mcg/mL to 1 mcg/mL). The approval letter for NDA 204200 states that a shelf life period of 15 months is granted for the 1 mg/mL product when stored at 20° C.-25° C. (68° F.-77° F.).

In September 2016, the FDA approved a supplemental NDA 204200/S-004 for the product marketed under the trademark ADRENALIN™ as a 1 mL sterile aqueous solution containing 1 mg/mL of epinephrine base, 7.3 mg/mL sodium chloride, 0.457 mg/mL sodium hydroxide, 1 mg/mL sodium hydroxide, 2.25 mg/mL tartaric acid, 0.20 mg/mL disodium edetate dihydrate, hydrochloric acid to adjust pH, and water for injection, and having a pH range of 2.2-5.0. The approval letter for NDA 204200/S-004 states that the shelf life of the 1 mg/mL product is extended to 24 months and that the mydriasis indication is removed from the labeling.

The product marketed under the trademark ADRENALIN™ also is available in the US under NDA 204640 packaged as 30 mL of solution in a multiple dose amber glass vial. In the 30 mL vial, each 1 mL of solution contains 1 mg epinephrine, 6.15 mg sodium chloride, 0.457 mg sodium metabisulfite, 0.920 mg sodium hydroxide, 2.25 mg tartaric acid, 0.20 mg disodium edetate dihydrate, hydrochloric acid to adjust pH, 5.25 mg chlorobutanol as a preservative and water for injection. The pH range is 2.2-5.0. The prescribing information states that the vial and contents must be discarded 30 days after initial use.

U.S. Pat. Nos. 9,119,876 and 9,295,657 disclose ready-to-inject epinephrine compositions that contain about 0.5 to 1.5 mg/mL of epinephrine and/or salts thereof, about 6 to 8 mg/mL of a tonicity regulating agent, about 2.8 to 3.8 mg/mL of a pH raising agent, about 0.1 to 1.1 mg/mL of an antioxidant, about 0.001 to 0.010 mL/mL of a pH lowering agent, and about 0.01 to 0.4 mg/mL of a transition metal complexing agent that is sodium bisulfite and/or sodium metabisulfite.

A pharmaceutical product containing 1 mg/mL epinephrine in a 2 mL clear glass ampule was approved for use in the United States in July 2014 under NDA 205029. The prescribing information states that the product is supplied as a sterile solution containing 1 mg/1 mL epinephrine as the hydrochloride in a preservative and sulfite free solution. Each mL contains 1 mg epinephrine base (as the hydrochloride), sodium chloride (9 mg/mL), and may contain hydrochloric acid for pH adjustment. The prescribing information also states that it must be diluted prior to infusion by adding 1 mL (1 mg) of epinephrine to 1,000 mL of a 5% dextrose or a 5% dextrose and sodium chloride solution. In February 2022, the FDA approved a supplemental NDA 205029/S-009 for a 10 mL solution in a multiple dose amber vial. In the 10 mL vial, each 1 mL contains 1 mg epinephrine, 5.0 mg chlorobutanol as preservative, 7.5 mg sodium chloride, 0.5 mg sodium metabisulfite, hydrochloric acid for pH adjustment and water for injection. The pH range is 2.2-5.0. In May 2023, the FDA approved a supplemental NDA 205029/S-010 for a 1 mL solution in a 1 mL single-dose prefilled clear glass syringe. In the 1 mL syringe, each mL contains 1 mg epinephrine, 8.6 mg sodium chloride, 0.5 mg sodium metabisulfite, hydrochloric acid for pH adjustment and water for injection. The pH range is 2.2-5.0. In December 2023, the FDA approved a supplemental NDA 205029/S-013 for a 30 mL solution in a multiple dose amber vial. In the 30 mL vial, each 1 mL contains 1 mg epinephrine, 7.5 mg sodium chloride, 0.5 mg sodium metabisulfite, hydrochloric acid for pH adjustment and water for injection. The pH range is 2.2-5.0.

U.S. Pat. Nos. 9,283,197, 10,004,700, and 10,039,728 and U.S. Patent Application Publication No. 2018/0333374 disclose liquid pharmaceutical formulations of a preservative free and sulfite-free, 1 mg/mL L-epinephrine sterile solution for injection having a pH between 2.8 and 3.3. The solution has no more than 6.5% total impurities at release, including no more than 6% d-epinephrine and no more than 0.5% adrenalone, and no more than 12.5% total impurities over a shelf-life of at least 12 months, including no more than 12% d-epinephrine and no more than 0.5% adrenalone. The formulations are stored in a container with an inert gas.

A pharmaceutical product containing 8-40 mcg/mL epinephrine in 0.9% sodium chloride in a premixed, ready-touse 250 mL infusion bag was approved for use in the United States in April 2023 under NDA 215875. The prescribing information states that the product is supplied as a clear, colorless, sterile solution administered by intravenous infusion. Each mL contains the equivalent of 8, 16, 20, 32, or 40 micrograms of epinephrine base along with a corresponding 6.6, 13.1, 16.4, 26.2, and 32.8 micrograms of L(+) tartaric acid, respectively. The product contains sodium chloride (9 mg/mL), disodium edetate dihydrate (10 mcg/mL), and may contain hydrochloric acid and/or sodium hydroxide for pH adjustment. It has a pH of 3.7-4.3, and the headspace of the bags has been displaced with nitrogen gas. The prescribing information also states that no further dilution prior to infusion is required. The product has an expiration date 24 months from the date of manufacture when stored at 20° C.-25° C. (68° F.-77° F.).

U.S. Pat. Nos. 10,653,646, 11,083,698, and 11,207,280 and U.S. Patent Publication No. 2022/0110891 disclose ready to administer epinephrine compositions that comprise an aqueous pharmaceutically acceptable carrier containing epinephrine, a tonicity agent, and a metal ion chelator. The epinephrine is present at a concentration of equal or less than 0.07 mg/ml, and substantially all of the epinephrine is an R-isomer. The compositions have a pH of between 3.0-4 and the metal ion chelator is present at a concentration of between about 1 and 50 g/ml. The compositions have storage stability such that after storage of at least one month, the epinephrine composition comprises total impurities of equal or less than 0.7% and equal or less than 4.5% S-isomer content. The epinephrine compositions are administered by injection without prior dilution from the container.

Epinephrine products intended for intramuscular or subcutaneous administration via autoinjector are available under the trademarks EPIPEN™, ADRENACLICK™, and AUVI-Q™. The product marketed under the trademark EPIPEN™ is formulated to contain, per 0.3 mL, 0.15 or 0.3 mg epinephrine, 1.8 mg sodium chloride, 0.5 mg sodium metabisulfite, water for injection, and hydrochloric acid to adjust pH to 2.2-5.0. The product marketed under the trademark ADRENACLICK™ is formulated to contain, per 0.15 mL or 0.3 mL, 0.15 mg or 0.3 mg epinephrine, 1.3 mg or 2.6 mg sodium chloride, not more than 0.75 mg or 1.5 mg chlorobutanol, 0.225 mg or 0.45 mg sodium bisulfite, water for injection, and hydrochloric acid and sodium hydroxide to adjust pH to 2.2-5.0. The product marketed under the trademark AUVI-Q™ is formulated to contain, per 0.1 mL, 0.15 mL or 0.3 mL, equivalent to 0.1 mg, 0.15 mg, or 0.3 mg epinephrine, respectively, 0.78 mg, 1.2 mg, or 2.3 mg sodium chloride, respectively, 0.15 mg, 0.2 mg, or 0.5 mg sodium bisulfite, respectively, water for injection, and hydrochloric acid to adjust pH to 2.2-5.0.

International PCT Publication No. 2014/127015 discloses a pharmaceutical formulation comprising epinephrine or a salt thereof, sulfobutyl ether O-cyclodextrin, and a tonicity modifier in an aqueous solution.

International PCT Publication No. 2017/218918 describes a pharmaceutical composition comprising epinephrine, an antioxidant in an amount of about 0.07 wt. % or less, a buffering agent, a chelating agent, and a tonicity modifier in an aqueous medium.

There remains a need in the art for improved liquid, injectable formulations of epinephrine which are storage stable, preferably for longer durations at room temperature.

BRIEF SUMMARY OF THE INVENTION

The invention provides a pharmaceutical formulation comprising epinephrine or a pharmaceutically acceptable salt thereof, an organic acid, a tonicity agent, and water. The formulation has a pH of from about 3.0 to about 3.6 and is substantially free of a conjugate base of the organic acid.

In some embodiments, the formulation comprises about 0.5-2.0 mg/mL epinephrine or a pharmaceutically acceptable salt thereof and about 0.25-1.0 mg/mL of an organic acid. In other embodiments, the formulation comprises about 1.0 mg/mL epinephrine or a pharmaceutically acceptable salt thereof and about 0.5 mg/mL of citric acid.

The invention also provides a pharmaceutical formulation comprising about 1.0 mg/mL epinephrine or a pharmaceutically acceptable salt thereof, about 0.5 mg/mL citric acid, about 8.6 mg/mL sodium chloride, about 0.25 mg/mL sodium metabisulfite, and water. The formulation has a pH of from about 3.0 to about 3.6 and is substantially free of a conjugate base of citric acid, e.g., citrate.

DETAILED DESCRIPTION OF THE INVENTION

The invention provides a pharmaceutical formulation comprising epinephrine or a pharmaceutically acceptable salt thereof, an organic acid, a tonicity agent, and water. The formulation has a pH of from about 3.0 to about 3.6 and is substantially free of a conjugate base of the organic acid. The formulation according to the invention is stable and has a shelf life of at least about 12 months.

The formulation of the invention is a liquid, which may be intended for dilution by a healthcare provider prior to use, or which may be provided as a "ready-to-administer" formulation, which refers to a sterile, injectable liquid formulation that need not be reconstituted from a solid or diluted from a concentrated solution by a healthcare provider prior to use.

The formulation according to the present invention is stable. As used herein, the terms "stable" and "stability" encompass any characteristic of the formulation which may change or be affected by storage conditions including, without limitation, potency, epinephrine impurities (e.g., epinephrine sulfonate or adrenalone), specific optical rotation (e.g., S-epinephrine), optical purity, appearance, viscosity, sterility, particulates (visible and subvisible), color, and/or clarity. The storage conditions which may affect stability may include, for example, duration, temperature, humidity, and/or light exposure.

For example, a stable epinephrine formulation may refer to a formulation that contains at least about 90%, e.g., at least about 92%, at least about 94%, at least about 95%, at least about 96%, at least about 97%, at least about 98%, or at least about 99% of the labeled concentration of epinephrine or pharmaceutically acceptable salt thereof after storage under room temperature (e.g., 25° C.±2° C./60% relative humidity (RH)+5% RH) and/or accelerated (e.g., at 40° C.±2° C./75% RH±5% RH) conditions. A stable epinephrine formulation also may refer to a formulation that is therapeutically effective and contains less than about 110%, e.g., less than about 108%, less than about 106%, less than about 105%, less than about 104%, less than about 103%, less than about 102%, or less than about 101% of the of the labeled concentration of epinephrine or pharmaceutically acceptable salt thereof after storage under room temperature and/or accelerated conditions. A stable epinephrine formulation additionally may refer to a formulation that contains an amount of epinephrine bounded by any two of the foregoing endpoints. For example, a stable epinephrine formulation may contain from about 90% to about 110%, about 92% to about 108%, about 95% to about 105%, from about 97% to about 103%, from about 98% to about 102%, or from about 99% to about 101%, of the labeled concentration of epinephrine or pharmaceutically acceptable salt thereof after storage under room temperature and/or accelerated conditions.

A stable epinephrine formulation also may refer to a formulation that contains less than about 10% (area percent), e.g., less than about 9.0%, less than about 8.0%, less than about 7.0%, less than about 6.0%, less than about 5.0%, less than about 4.0%, less than about 3.0%, less than about 2.0%, or less than about 1.0%, of total epinephrine-related impurities present in the formulation after storage under room temperature and/or accelerated conditions. A stable epinephrine formulation additionally may refer to a formulation that is safe and effective and contains total epinephrine-related impurities present in an amount of about 0.5% or more, e.g., about 1.0% or more, about 1.5% or more, about 2.0% or more, about 2.5% or more, about 3.0% or more, about 3.5% or more, about 4.0% or more, about 4.5% or more, about 5.0% or more, or about 5.5% or more after storage under room temperature and/or accelerated conditions. A stable epinephrine formulation also may refer to a formulation that contains total epinephrine-related impurities present in an amount bounded by any two of the aforementioned endpoints. For example, a stable epinephrine formulation also may refer to a formulation that contains from about 1.0% to about 10%, e.g., from about 1.5% to about 9.0%, from about 2.0% to about 6.0%, from about 4.5% to about 9.0%, from about 0.5% to about 5.0%, from about 1.5% to about 4.0%, from about 1.0% to about 2.5%, or from about 0.5% to about 2.0%, of total epinephrine-related impurities present in the formulation after storage under room temperature and/or accelerated conditions.

A stable epinephrine formulation also may refer to a formulation that contains less than about 8.0% (area percent), e.g., less than about 7.5%, less than about 7.0%, less than about 6.5%, less than about 6.0%, less than about 5.5%, less than about 5.0%, less than about 4.0%, less than about 3.0%, less than about 2.0%, less than about 1.5%, less than about 1.0%, less than about 0.8%, less than about 0.4%, or less than about 0.2%, of any individual epinephrine-related impurity (e.g., epinephrine sulfonate or adrenalone) present in the formulation after storage under room temperature and/or accelerated conditions. A stable epinephrine formulation additionally may refer to a formulation that is safe and effective and contains any individual epinephrine-related impurity (e.g., epinephrine sulfonate or adrenalone) present in an amount of about 0.05% or more, e.g., about 0.1% or more, about 0.3% or more, about 0.5% or more, about 1.5% or more, about 3.0% or more, about 4.5% or more, or about 6.0% or more, after storage under room temperature and/or accelerated conditions. A stable epinephrine formulation also may refer to a formulation that contains any individual epinephrine-related impurity (e.g., epinephrine sulfonate or adrenalone) present in an amount bounded by any two of the aforementioned endpoints. For example, a stable epinephrine formulation additionally may refer to a formulation that contains from about 0.05% to about 8.0%, from about 0.05% to about 0.3%, from about 0.05% to about 0.1%, from about 0.5% to about 6.0%, from about 1.5% to about 6.5%, or from about 3.0% to about 7.5% of any individual epinephrine-related impurity (e.g., epinephrine sulfonate or adrenalone) present in the formulation after storage under room temperature and/or accelerated conditions.

A stable epinephrine formulation also may refer to a formulation that contains less than about 10% (area percent), e.g., less than about 9.0%, less than about 8.0%, less than about 7.0%, less than about 6.5%, less than about 6.0%, less than about 5.0%, less than about 4.0%, less than about 3.0%, less than about 2.0%, less than about 1.0%, less than about 0.8%, less than about 0.4%, or less than about 0.2%, of S-isomer of ephinephrine present in the formulation after storage under room temperature and/or accelerated conditions. A stable epinephrine formulation additionally may refer to a formulation that is safe and effective and contains S-isomer present in an amount of about 0.1% or more, e.g., about 0.3% or more, about 0.5% or more, about 0.7% or more, about 0.9% or more, about 1.2% or more, about 1.5% or more, about 2.5% or more, about 3.5% or more, or about 4.5% or more, after storage under room temperature and/or accelerated conditions. A stable epinephrine formulation also may refer to a formulation that contains S-isomer present in an amount bounded by any two of the aforementioned endpoints. For example, a stable epinephrine formulation additionally may refer to a formulation that contains about 0.1% to about 10.0%, about 0.5% to about 8.0%, about 1.5% to about 7.0%, about 1.2% to about 3.0%, about 2.5% to about 6.0%, or about 0.9% to about 4.0% of S-isomer of ephinephrine present in the formulation after storage under room temperature and/or accelerated conditions.

A stable epinephrine formulation also may refer to a formulation that contains nitrosamines (e.g., N-nitroso-epinephrine) in an amount of about 5000 parts per billion (ppb) or less, e.g., about 4000 ppb or less, about 3000 ppb or less, about 2000 ppb or less, about 1000 ppb or less, about 800 ppb or less, about 600 ppb or less, about 500 ppb or less, about 400 ppb or less, about 300 ppb or less, about 200 ppb or less, or about 100 ppb or less, after storage under room temperature and/or accelerated conditions. A stable epinephrine formulation additionally may refer to a formulation that is safe and effective and contains nitrosamines (e.g., N-nitroso-epinephrine) in an amount of about 50 ppb or more, e.g., about 75 ppb or more, about 100 ppb or more, about 125 ppb or more, about 150 ppb or more, about 200 ppb or more, about 250 ppb or more, about 300 ppb or more, or about 350 ppb or more, after storage under room temperature and/or accelerated conditions. A stable epinephrine formulation also may refer to a formulation that contains nitrosamines (e.g., N-nitroso-epinephrine) in an amount bounded by any two of the aforementioned endpoints. For example, a stable epinephrine formulation may contain nitrosamines (e.g., N-nitroso-epinephrine) in an amount of from about 50 ppb to about 5000 ppb, from about 50 ppb to about 2000 ppb, from about 75 ppb to about 3000 ppb, from about 125 ppb to about 2000 ppb, from about 100 ppb to about 1000 ppb, from about 150 ppb to about 600 ppb, or from about 300 ppb to about 500 ppb, after storage under room temperature and/or accelerated conditions.

In some embodiments, the epinephrine formulation of the invention is stable for at least about 9 months, e.g., at least about 12 months, at least about 18 months, at least about 21 months, at least about 24 months, or at least about 36 months at room temperature (e.g., at 25±2° C./60% RH+5% RH) or at refrigerated temperature (e.g., at 5±3° C.). The invention also includes embodiments in which the epinephrine formulation of the invention is stable for at least about 1 month, e.g., at least about 3 months, at least about 6 months, or at least about 12 months under accelerated conditions (e.g., at 40° C.±2° C./75% RH+5% RH).

Methods for determining the stability of a formulation of the invention with respect to a given parameter are well-known in the art. For example, assay, individual impurities, and total impurities may be assessed by high-performance liquid chromatography (HPLC) or thin layer chromatography (TLC). Unless indicated otherwise, a percentage amount of epinephrine, S-epinephrine, any individual impurity, or total impurities reported herein in the formulation is determined by a peak area percent method using HPLC, and nitrosamines (e.g., N-nitroso-epinephrine or NNE) are determined by liquid chromatography tandem mass spectrometry (LC-MS/MS). Non-limiting methods of analyzing the formulation of the invention are described, for example, in U.S. Pat. No. 10,653,646.

In some embodiments, a stable epinephrine formulation may refer to a formulation that is colorless after storage under room temperature and/or accelerated conditions. The color of the formulation may be determined, for example, by a United States Pharmacopoeia (USP) or European Pharmacopoeia (Ph. Eur.) color method.

The formulation may include a therapeutically effective amount of epinephrine or a pharmaceutically acceptable salt thereof, such as, e.g., epinephrine bitartrate, epinephrine tartrate, or epinephrine HCl. Preferably, the epinephrine is of high enantiomeric purity or enantiomerically pure, e.g., at least about 90% of R-isomer relative to all possible (R and S) enantiomers combined, at least about 92.5% of R-isomer relative to all possible enantiomers, at least about 95% of R-isomer relative to all possible enantiomers, at least about 97% of R-isomer relative to all possible enantiomers, or at least about 99% of R-isomer relative to all possible enantiomers. In some embodiments, the formulation includes a therapeutically effective amount of epinephrine base, which is preferably of high enantiomeric purity or enantiomerically pure as described herein.

The concentration of epinephrine or pharmaceutically acceptable salt thereof in the formulation of the invention may be selected based upon the intended primary container type, whether any dilution is required before administration, and/or route of administration. For example, the epinephrine or pharmaceutically acceptable salt thereof in the formulation of the invention may be at a concentration of from about 1 µg/mL to about 10 mg/mL, e.g., from about 5 µg/mL to about 5 mg/mL, from about 8 µg/mL to about 40 µg/mL, from about 200 µg/mL to about 4 mg/mL, from about 0.1 mg/mL to about 1 mg/mL, or from about 0.5 mg/mL to about 2 mg/mL. In some embodiments, the formulation comprises about 1 mg/mL epinephrine (as free base or free base equivalent). In other embodiments, the formulation comprises about 0.1 mg/mL epinephrine. In yet other embodiments, the formulation comprises about 8 µg/mL, about 16 µg/mL, about 20 µg/mL, about 32 µg/mL, or about 40 µg/mL epinephrine.

The volume of the formulation of the invention may be selected based upon the intended primary container type, whether any dilution is required before administration, and/or route of administration. For example, the volume of the formulation may be about 0.1 mL or more, e.g., about 0.3 mL or more, about 0.5 mL or more, about 1 mL or more, about 5 mL or more, about 10 mL or more, about 30 mL or more, about 50 mL or more, about 100 mL or more, about 150 mL or more, about 200 mL or more, or about 250 mL or more. In other embodiments, the volume of the formulation is about 1 L or less, e.g., about 750 mL or less, about 500 mL or less, about 250 mL or less, about 200 mL or less, about 100 mL or less, about 40 mL or less, about 30 mL or less, about 20 mL or less, about 10 mL or less, about 1 mL or less, or about 0.5 mL or less. The formulation also may be provided in a volume bounded by any two of the aforementioned endpoints. For example, the formulation may be provided in a volume of from about 0.1 mL to about 1 L, from about 0.1 mL to about 0.5 mL, from about 0.5 mL to about 5 mL, from about 1 mL to about 30 mL, or from about 200 mL to about 300 mL. In some embodiments, the volume of the formulation is about 0.3 mL. In certain embodiments, the volume of the formulation is about 1 mL. In other embodiments, the volume of the formulation is about 10 mL. In yet other embodiments, the volume of the formulation is about 30 mL. In still yet other embodiments, the volume of the formulation is about 250 mL.

The present invention is based, at least in part, on the surprising and unexpected discovery that an organic acid can stabilize the epinephrine formulation even in the absence of a conjugate base to the organic acid. In some embodiments, the formulation comprises citric acid and is substantially free of citrate, acetic acid and is substantially free of acetate, or lactic acid and is substantially free of lactate. In certain embodiments, the formulation comprises citric acid and the formulation is substantially free of citrate.

By "substantially free of a conjugate base of the organic acid" is meant that no amount of a conjugate base of the organic acid is added during manufacture of the formulation. In certain embodiments, no amount of a conjugate base of the organic acid is expected to be present in the formulation as a result of, for example, a reaction of the organic acid with a base. In such embodiments, any anionic form of the organic acid that may be formed in situ, e.g., as a result of reaction with a base, is not regarded as a conjugate base of the organic acid as described herein. Thus, in certain embodiments, any amount of such a conjugate base of the organic acid formed in situ in the formulation is considered an impurity, and is present at a very low concentration of, e.g., less than 1 µg/mL, e.g., less than 0.05 µg/mL, less than 0.01 µg/mL, or less than 0.005 µg/mL.

In other embodiments, the organic acid is malic acid, fumaric acid, succinic acid, oxalic acid, isocitric acid, aconitic acid, trimesic acid, tartaric acid, propane-1,2,3-tricarboxylic acid, malonic acid, glutaric acid, or succinic acid, and the formulation is substantially free of a conjugate base of the aforementioned organic acid. In certain embodiments, however, the formulation does not contain tartaric acid or tartrate.

The organic acid may be present in the formulation in any suitable concentration. For example, the organic acid may be present in the formulation at a concentration of about 0.005 mg/mL or more, e.g., about 0.01 mg/mL or more, about 0.05 mg/mL or more, 0.1 mg/mL or more, about 0.125 mg/mL or more, about 0.25 mg/mL or more, about 0.4 mg/mL or more, about 0.5 mg/mL or more, about 0.6 mg/mL or more, about 1 mg/mL or more, about 5 mg/mL or more, about 7.5 mg/mL or more, or about 10 mg/mL or more. Alternatively, the organic acid may be present in the formulation at a concentration of about 50 mg/mL or less, for example, about 25 mg/mL or less, about 10 mg/mL or less, about 7.5 mg/mL or less, about 5 mg/mL or less, about 2.5 mg/mL or less, about 2 mg/mL or less, about 1 mg/mL or less, about 0.75 mg/mL or less, about 0.6 mg/mL or less, about 0.5 mg/mL or less, or about 0.1 mg/mL or less. The organic acid also may be present in the formulation in a concentration bounded by any two of the aforementioned endpoints. For example, the organic acid may be present in the formulation in a concentration of from about 0.005 mg/mL to about 50 mg/mL, e.g., from about 0.05 mg/mL to about 5 mg/mL, from about 0.1 mg/mL to about 10 mg/mL, from about 0.1 mg/mL to about 1 mg/mL, from about 0.125 mg/mL to about 0.75 mg/mL, from about 0.25 mg/mL to about 0.75 mg/mL, from about 0.4 mg/mL to about 1 mg/mL, or from about 0.4 mg/mL to about 0.6 mg/mL.

In certain embodiments, the organic acid is citric acid. In some embodiments, the formulation comprises citric acid in an amount of from about 0.1 mg/mL to about 1 mg/mL, from about 0.125 mg/mL to about 0.75 mg/mL, from about 0.25 mg/mL to about 0.75 mg/mL, from about 0.4 mg/mL to about 1 mg/mL, or from about 0.4 mg/mL to about 0.6 mg/mL. In certain embodiments, the formulation comprises about 0.5 mg/mL citric acid.

In some embodiments, the weight ratio of the epinephrine or pharmaceutically acceptable salt thereof to the organic acid is about 1:10 to about 20:1, e.g., about 1:5 to about 10:1, or about 1:2 to about 5:1, or about 1:1 to about 4:1, or about 1.5:1 to about 3:1. In certain embodiments, the formulation comprises citric acid, and the weight ratio of the epinephrine or pharmaceutically acceptable salt thereof to the citric acid is about 1:10 to about 20:1, e.g., about 1:5 to about 10:1, or about 1:2 to about 5:1, or about 1:1 to about 4:1, or about 1.5:1 to about 3:1. In certain embodiments, the weight ratio of the epinephrine or pharmaceutically acceptable salt thereof to the citric acid is about 2:1.

The formulation of the invention may include at least one antioxidant. In some embodiments, the antioxidant comprises a sulfite or a bisulfite, each of which may be added to the formulation in anhydrous or hydrated form. In certain embodiments, the antioxidant comprises sodium metabisulfite.

In some embodiments, the antioxidant may include an amino acid or a pharmaceutically acceptable salt thereof. The amino acid may include an L-stereoisomer, a D-stereoisomer, or a combination thereof. In some embodiments, the amino acid is naturally occurring. For example, the amino acid may include alanine, arginine, asparagine, aspartic acid, cysteine, glutamic acid, glutamine, glycine, histidine, isoleucine, leucine, lysine, methionine, phenylalanine, proline, serine, threonine, tryptophan, tyrosine, valine, selenocysteine, pyrrolysine, or a combination thereof. In some embodiments, the amino acid may include tryptophan, methionine, histidine, lysine, arginine, or tyrosine. The invention also includes embodiments in which the amino acid comprises at least two primary or secondary amine groups, such as arginine, asparagine, lysine, methyl lysine, or ornithine. In certain embodiments, the antioxidant includes arginine.

In certain embodiments, the formulation comprises two or more antioxidants. For example, the formulation may comprise a sulfite/bisulfite and an amino acid, or pharmaceutically acceptable salts thereof. In certain embodiments, the formulation comprises sodium metabisulfite and arginine.

The antioxidant may be present in the formulation in any suitable concentration. For example, the antioxidant may be present in the formulation at a concentration of about 10 μg/mL or more, e.g., about 25 μg/mL or more, about 50 μg/mL or more, about 62.5 μg/mL or more, about 0.125 mg/mL or more, about 0.25 mg/mL or more, about 0.4 mg/mL or more, about 0.5 mg/mL or more, about 0.6 mg/mL or more, about 1 mg/mL or more, about 5 mg/mL or more, about 7.5 mg/mL or more, or about 10 mg/mL or more. Alternatively, the antioxidant may be present in the formulation at a concentration of about 50 mg/mL or less, for example, about 25 mg/mL or less, about 10 mg/mL or less, about 7.5 mg/mL or less, about 5 mg/mL or less, about 2.5 mg/mL or less, about 2 mg/mL or less, about 1 mg/mL or less, about 0.75 mg/mL or less, about 0.5 mg/mL or less, or about 0.1 mg/mL or less. The antioxidant also may be present in the formulation in a concentration bounded by any two of the aforementioned endpoints. For example, the antioxidant may be present in the formulation in a concentration of from about 10 μg/mL to about 50 mg/mL, e.g., from about 50 μg/mL to about 5 mg/mL, from about 0.1 mg/mL to about 10 mg/mL, from about 0.1 mg/mL to about 1 mg/mL, from about 0.125 mg/mL to about 0.5 mg/mL, from about 0.5 mg/mL to about 2.5 mg/mL, from about 1 mg/mL to about 2.5 mg/mL, or from about 1 mg/mL to about 2 mg/mL.

The invention also includes embodiments in which the formulation is substantially free of a metal ion chelator. The invention thus includes embodiments in which the formulation is substantially free of, e.g., an aminopolycarboxylic acid such as, for example, ethylenediaminetetraacetic acid (EDTA), ethylene glycol-bis(R-aminoethyl ether)-N,N,N', N'-tetraacetic acid (EGTA), diethylenetriaminepentaacetic acid (DTPA), or a salt thereof. The invention further includes embodiments in which the formulation is substantially free of, e.g., butylated hydroxyl anisole (BHA), butylated hydroxyl toluene (BHT), alpha-tocopherol, or propyl gallate. The term "substantially free" as used herein with respect to an excipient means that no amount of the excipient is added during manufacture of the formulation and, if present, only may be present as an impurity.

The formulation of the invention also may include at least one tonicity agent. Suitable tonicity agents may include, without limitation, sodium chloride, dextrose, mannitol, trehalose, potassium chloride, glycerol, or a combination thereof. In some embodiments, the tonicity agent includes sodium chloride. In other embodiments, the tonicity agent includes dextrose. In certain embodiments, the tonicity agent includes sodium chloride and the formulation is substantially free of dextrose. The tonicity agent is preferably present in an amount that renders the formulation isotonic. For example, the tonicity agent may present in an amount sufficient to provide the formulation with an osmolality of about 250-350 mOsm/kg, e.g., about 270-330 mOsm/kg, about 260-320 mOsm/kg, about 300-340 mOsm/kg, about 280-300 mOsm/kg, or about 310-330 mOsm/kg. In some embodiments, the tonicity agent is present in an amount that provides the formulation with an osmolality of 290 mOsm/kg±10%. The invention also includes embodiments in which the formulation includes about 8.6 mg/mL sodium chloride.

In some embodiments, the formulation of the invention includes at least one preservative. Suitable preservatives include, without limitation, benzalkonium chloride, benzethonium chloride, benzoic acid, benzyl alcohol, benzyl paraben, bronopol, butyl paraben, cetrimide, cetylpyridinium chloride, chlorbutanol, chlorhexidine, chlorocresol, chloroxylenol, cresol, ethyl alcohol, ethyl paraben, ethylparaben, glycerin, hexetidine, imidurea, isobutyl paraben, meta-cresol, methylparaben, phenol, phenoxyethanol, phenylethyl alcohol, phenylmercuric nitrate, p-hydroxybenzoic acid esters, polyhexamethylene biguanide, potassium sorbate, propyl paraben, propylene glycol, sodium benzoate, sodium perborate, sodium propionate, sorbic acid, stabilized thimerosal, and/or thimerosal. In certain embodiments, the preservative comprises a paraben, such as methylparaben. The preservative may be present at any suitable concentration, e.g., about 0.1 mg/mL to about 10 mg/mL, about 0.5 mg/mL to about 5 mg/mL, about 0.75 mg/mL to about 1.5 mg/mL. In some embodiments, the formulation comprises about 1 mg/mL of a preservative. In certain embodiments, the formulation comprises about 1 mg/mL methylparaben.

The formulation of the invention may further include at least one additional excipient. Non limiting examples of suitable excipients may include, for example, diluents, salts, stabilizers, solubilizers, and the like, and combinations thereof. In some embodiments, however, the formulation is free of an additional excipient, or substantially free of an additional excipient.

The formulation of the invention also may include at least one additional active pharmaceutical ingredient (API). Not limiting examples of suitable APIs include, for example, anesthetics such as bupivacaine, analgesics such as meloxicam, or vasoconstrictors such as norepinephrine. In some embodiments, the formulation of the invention is free of an additional API. In certain embodiments, the formulation does not contain bupivacaine, lidocaine, articaine, prilocaine, etidocaine, ropivacaine, procaine, propoxycaine. In other embodiments, the formulation does not contain norepinephrine or phenylephrine.

The formulation of the invention may further include a suitable pH adjuster. A suitable pH adjuster may include, for example, sodium hydroxide, potassium hydroxide, hydrochloric acid, or a combination thereof. In some embodiments, the formulation comprises hydrochloric acid and does not contain a base.

The formulation of the invention may have any suitable pH. In some embodiments, the formulation may have a pH of about 2.2 or more, e.g., about 2.4 or more, about 2.6 or more, about 2.8 or more, about 3.0 or more, about 3.1 or more, about 3.2 or more, about 3.3 or more, about 3.4 or more, about 3.5 or more, about 3.6 or more, about 3.7 or more, about 3.8 or more, about 3.9 or more, or about 4.0 or more. In some embodiments, the formulation may have a pH of about 5.0 or less, e.g., about 4.8 or less, about 4.6 or less, from about 4.5 or less, from about 4.4 or less, about 4.3 or less, about 4.2 or less, about 4.1 or less, about 4.0 or less, about 3.9 or less, about 3.8 or less, about 3.7 or less, about 3.6 or less, or about 3.5 or less. The invention also includes embodiments in which the formulation may have a pH bounded by any two of the foregoing endpoints. For example, the formulation may have a pH of from about 2.2 to about 5.0, from about 2.6 to about 4.5, from about 2.8 to about 4.0, from about 3.0 to about 3.8, from about 3.0 to about 3.6, from about 3.1 to about 3.5, or from about 3.2 to about 3.4. In some embodiments, the formulation has a pH of about 4.0, about 3.9, about 3.8, about 3.7, or about 3.6, about 3.5, about 3.4, about 3.3, about 3.2, about 3.1, about 3.0, about 2.9, about 2.8, about 2.7, or about 2.6.

The formulation of the invention may be formulated to exhibit a stable pH following storage under room temperature and/or accelerated conditions. In some embodiments, the pH drift of the formulation is less than about 0.4 pH units, e.g., less than about 0.3 pH units, less than about 0.25 pH units, less than about 0.2 pH units, less than about 0.15 pH units, less than about 0.1 pH units, or less than about 0.05 pH units, following storage for at least about 12 months at room temperature. The invention also includes embodiments in which the pH drift of the formulation is less than about 0.4 pH units, e.g., less than about 0.3 pH units, less than about 0.25 pH units, less than about 0.2 pH units, less than about 0.15 pH units, less than about 0.1 pH units, or less than about 0.05 pH units, following storage for at least about 18 months at room temperature. In some embodiments, the pH drift of the formulation is less than about 0.4 pH units, e.g., less than about 0.3 pH units, less than about 0.25 pH units, less than about 0.2 pH units, less than about 0.15 pH units, less than about 0.1 pH units, or less than about 0.05 pH units, following storage for at least about 24 months at room temperature.

In some embodiments, the invention provides a pharmaceutical formulation consisting essentially of, or consisting of, epinephrine or a pharmaceutically acceptable salt thereof, an organic acid, a tonicity agent, and water. The formulation may have a pH of from about 3.0 to about 3.6. In one embodiment, the invention provides a pharmaceutical formulation consisting essentially of epinephrine or a pharmaceutically acceptable salt thereof, citric acid, sodium chloride, and water. The formulation may has a pH of from about 3.0 to about 3.6. In another embodiment, the invention provides a pharmaceutical formulation consisting of epinephrine or a pharmaceutically acceptable salt thereof, citric acid, sodium chloride, and water. The formulation has a pH of from about 3.0 to about 3.6.

The invention also provides a pharmaceutical formulation which comprises about 0.5-2.0 mg/mL epinephrine or a pharmaceutically acceptable salt thereof, about 0.25-1.0 mg/mL of an organic acid, a tonicity agent, and water. The formulation has a pH of from about 3.0 to about 3.6 and is substantially free of a conjugate base of the organic acid.

The invention also provides a pharmaceutical formulation which consists essentially of, or consists of, about 0.5-2.0 mg/mL epinephrine or a pharmaceutically acceptable salt thereof, about 0.25-1.0 mg/mL of an organic acid, a tonicity agent, and water. The formulation may have a pH of from about 3.0 to about 3.6. In one embodiment, the invention provides a pharmaceutical formulation consisting essentially of 0.5-2.0 mg/mL epinephrine or a pharmaceutically acceptable salt thereof, 0.25-1.0 mg/mL citric acid, sodium chloride, and water. The formulation has a pH of from about 3.0 to about 3.6. In another embodiment, the invention provides a pharmaceutical formulation consisting of about 0.5-2.0 mg/mL epinephrine or a pharmaceutically acceptable salt thereof, 0.25-1.0 mg/mL citric acid, sodium chloride, and water. The formulation has a pH of from about 3.0 to about 3.6.

The invention also provides a pharmaceutical formulation which comprises about 1.0 mg/mL epinephrine or a pharmaceutically acceptable salt thereof, about 0.5 mg/mL citric acid, sodium chloride, and water. The formulation has a pH of from about 3.0 to about 3.6 and is substantially free of citrate.

The invention further provides a pharmaceutical formulation which consists essentially of, or consists of, about 1.0 mg/mL epinephrine or a pharmaceutically acceptable salt thereof, about 0.5 mg/mL citric acid, sodium chloride, and water. The formulation may have a pH of from about 3.0 to about 3.6.

The invention also provides a pharmaceutical formulation which comprises about 1.0 mg/mL epinephrine or a pharmaceutically acceptable salt thereof, about 0.5 mg/mL citric acid, about 8.6 mg/mL sodium chloride, about 0.25 mg/mL sodium metabisulfite, and water. The formulation has a pH of from about 3.0 to about 3.6 and is substantially free of citrate.

The invention further provides a pharmaceutical formulation which consists essentially of, or consists of, about 1.0 mg/mL epinephrine or a pharmaceutically acceptable salt thereof, about 0.5 mg/mL citric acid, about 8.6 mg/mL sodium chloride, about 0.25 mg/mL sodium metabisulfite, and water. The formulation may have a pH of from about 3.0 to about 3.6.

The invention further provides a pharmaceutical product which includes a primary container with the epinephrine formulation of the invention contained therein. The liquid formulation component of the pharmaceutical product may include formulations having the same composition and characteristics (e.g., stability) as described herein with respect to the formulation of the invention. The primary container may include, for example, a vial, a syringe, a cartridge, an ampoule, a bag, or a bottle. In some embodiments, the primary container includes a vial. Preferably, the primary container is sealed by way of a closure, such as a stopper, plunger, and/or tip-cap.

The primary container and closure may be made of glass, plastic, and/or rubber. One or more surfaces of the primary container and/or closure may be treated with a compound to limit reactivity with one or more components of the formulation. In some embodiments, the primary container and/or closure are treated with silicon. In other embodiments, the primary container is treated with ammonium sulfate. In certain embodiments, the closure comprises bromobutyl or chlorobutyl rubber and is optionally coated with a fluoropolymer. The primary container can be clear or opaque, and can be any color, or colorless. In some embodiments, the primary container is flint colored. In other embodiments, the primary container is amber colored.

In some embodiments, the primary container includes a syringe. The syringe barrel may include or be made of, e.g., glass or plastic. A suitable plastic syringe may include a syringe barrel which includes or is made of an organic polymer such as, e.g., a polyethylene, a polypropylene, cycloolefin polymers (COP), or cycloolefin copolymers (COC). In some embodiments, the plastic syringe barrel may include COC. The invention also includes embodiments in which the plastic syringe barrel includes an amorphous COC that is copolymerized from norbornene and ethylene using a metallocene catalyst, such as, e.g., the product marketed under the trademark TOPAS™ COC manufactured by Topas Advanced Polymers GmbH. Non-limiting examples of syringes suitable for use in the present invention are described in US Patent Application Publication No. 2015/0273133 which is incorporated herein by reference in its entirety.

The primary container also may include, for example, a flexible, multi-layered bag. The bag may include a material which is chemically inert to the formulation, sterilizable, and weldable. Such materials include, without limitation, polyolefin polymers (e.g., a polyethylene or polypropylene), COP or COC, polycarbonates, styrene polymers, and block co-polymers thereof. In some embodiments, a polyolefin may be combined with an elastomeric polymer, such as, e.g., a styrene-ethylene/butylene-styrene-triblock polymer (SEBS), a styrene-ethylene/propylene-styrene-triblock polymer (SEPS), a styrene-butadiene-styrene-triblock polymer (SBS), and/or a styrene-isoprene-styrene triblock polymer (SIS). In certain embodiments, the innermost layer of the multi-layered bag comprises polypropylene and SEBS. In other embodiments, the innermost layer of the multi-layered bag comprises a polymer of cyclic olefin such as cycloolefin homopolymer or cycloolefin copolymer or mixture thereof. In yet other embodiments, the innermost layer of the multi-layered bag comprises ethylene-vinyl acetate copolymer. Suitable flexible bags are described in U.S. Pat. Nos. 5,783,269, 7,875,016, 8,162,915, 7,828,787, and/or 8,118,802, which are incorporated herein by reference in their entireties, and marketed under the trademark, FREE-FLEX™. Other flexible polymeric containers suitable for use with a formulation according to the invention include, without limitation, products marketed under the trademarks GALAXY™, VIAFLO™, INTRAVIA™, and EXCEL™ containers.

In some embodiments, the primary container is disposed within and enclosed by a secondary container, such as a blister package or an overwrap. The secondary container may include an overwrap with, e.g., a first foil, a second foil, and a seal disposed along a common peripheral edge of the first and second foils. The first and second foils of the secondary container overwrap may include multilayer films.

In some embodiments, the secondary container is fully transparent to enable visual inspection of the primary container, labeling, and any other contents within the secondary container (e.g., oxygen absorber). The invention also includes embodiments in which the secondary container is fully intransparent, for example, an aluminum overpouch. The invention additionally includes embodiments in which the secondary container includes a completely or partially intransparent first foil and a completely or partially transparent second foil. Examples of secondary containers suitable for use in the present invention are described in US Patent Application Publication Nos. 2006/0240204 and 2019/0151202, which are incorporated herein by reference in their entireties.

The pharmaceutical product may further include an oxygen absorber that absorbs and removes or decreases the level of oxygen that may be present in the liquid epinephrine formulation, in the headspace of the primary container, and/or within the secondary container after initial packaging, as well as oxygen that may permeate through the secondary container during the shelf life of the pharmaceutical product. The oxygen absorber may be provided in any suitable size, form, or shape including, for example, a sachet, pouch, capsule, label, strip, patch, canister, cartridge, lining, or sticker, etc. The oxygen absorber may be placed inside of the secondary container or adhered or integrated into the primary container and/or the secondary container. In some embodiments, the oxygen absorber may be in the form of a sachet or in the form of a canister. The pharmaceutical product of the invention also includes embodiments in which the oxygen absorber may be in the form of a label or in the form of a strip. The pharmaceutical product of the invention additionally includes embodiments in which the oxygen absorber may be in the form of a sticker or label that adheres to the secondary container or to the primary container. The pharmaceutical product of the invention further includes embodiments in which the oxygen absorber may be incorporated as part of the secondary container itself such as, for example, as part of a lid, film, or seal of the secondary container.

Suitable materials for oxygen absorbers may include, for example, metal-based substances that remove oxygen by reacting with it by chemical bonding, generally forming a metal oxide component. Metal-based substances may include, e.g., elemental iron as well as iron oxide, iron hydroxide, iron carbide, and the like, and combinations thereof. Other metals for use as oxygen absorbers may include, e.g., nickel, tin, copper, zinc, and combinations thereof. Metal-based oxygen absorbers may be provided in the form of a powder, e.g., to increase active surface area. Powder forms of suitable metal-based oxygen absorbers may be obtained by any known method including, but not limited to, atomization, milling, pulverization, and electrolysis. Additional materials for oxygen absorbers may include, e.g., low molecular weight organic compounds such as, e.g., ascorbic acid, sodium ascorbate, catechol and phenol, activated carbon, polymeric materials incorporating a resin and a catalyst, and combinations thereof. In some embodiments, the oxygen absorber includes a metal-based oxygen absorber, such as an iron-based oxygen absorber.

A formulation of the invention that includes epinephrine or a pharmaceutically acceptable salt thereof, an organic acid, and a tonicity agent may be prepared by any suitable technique, many of which are known in the art. The formulation also may be prepared, e.g., in a batch or continuous process. In some embodiments, the formulation may be prepared by combining the components thereof in any order.

The term "component" as used herein includes individual ingredients (e.g., epinephrine, organic acid, tonicity agent, pH adjuster, optional antioxidant, etc.) as well as any combination of two or more individual ingredients. In some embodiments, the formulation may be formed by combining the components together in a vessel. Such components may be combined in any order.

Thus, the invention provides a method for making a liquid epinephrine formulation that is stable for at least 9 months at room temperature. In some embodiments, the method includes (1) dissolving a tonicity agent, an organic acid, optional antioxidant, and optional preservative in water to form a first solution, (2) adjusting the first solution to pH of from about 3.0 to about 3.4 to form a second solution, (3) dissolving a pharmaceutically effective amount of epinephrine or a pharmaceutically acceptable salt thereof in the second solution to form an epinephrine solution, and (4) sterilizing the epinephrine solution to provide the liquid epinephrine formulation.

In some embodiments, the method of the invention includes adding water to a suitable vessel, adding the organic acid and tonicity agent, either sequentially or together, and stirring the mixture until dissolution is complete. Next, the pH may be adjusted to the desired value by adding one or more pH adjusters. Subsequently, the epinephrine or pharmaceutically acceptable salt thereof may be added, and the mixture stirred until dissolution is complete or substantially complete. Next, the volume of the formulation may adjusted to a desired volume with water, filtered through one or more sterilizing filters, and filled into primary containers. Then, the primary container may be sealed and optionally placed into a secondary container, which may then be sealed. In some embodiments, an oxygen absorber may be placed into the secondary container before it is sealed. Preferably, dissolved oxygen is removed and/or minimized during the compounding process, e.g., by nitrogen sparging, at one or more steps of the compounding, filling, and/or packaging processes.

In some embodiments, the sealed, pharmaceutical product is sterilized by terminal sterilization, e.g., autoclaving. In certain embodiments, a formulation according to the present invention is autoclaved at a temperature of 120° C.-122° C. and a pressure of 0.5 bar to 2.5 bar for 5-20 minutes, e.g., 1.0-1.5 bar for 5-15 minutes. In some embodiments, the thermal sterilization is carried out at a temperature of about 122° C. and a pressure of about 1.2 bar for 5 minutes. In other embodiments, the thermal sterilization is carried out at a temperature of about 122° C. and a pressure of about 1.2 bar for 15 minutes. The pharmaceutical product also may be manufactured using aseptic processing techniques, such that terminal sterilization would not be required.

The invention also provides a method of stabilizing an epinephrine formulation by forming a mixture which includes epinephrine or a pharmaceutically acceptable salt thereof, an organic acid, a tonicity agent, and water, thereby stabilizing the formulation. The type/form and amounts of epinephrine or pharmaceutically acceptable salt thereof, organic acid, and tonicity agent present in the mixture, as well as the pH, may include the same types/forms and amounts of these components, and the pH, as described herein with respect to a formulation of the invention. The formulation produced by the inventive method of stabilizing an epinephrine formulation may have the same stability characteristics as the stability characteristics described herein with respect to a formulation of the invention, particularly with regard to pH, API assay, total impurities, individual impurities, S-isomer, and nitrosamines.

The formulation according to the invention is suitable for administration to a subject to treat or prevent a disease or condition, including a disease or condition that is treatable with epinephrine or a pharmaceutically acceptable salt thereof. Preferably, the subject is a mammal such as, for example, a human. The disease or condition that is treatable by the administration of epinephrine or a pharmaceutically acceptable salt thereof may include, for example, low blood pressure, or any other indication for which the product marketed under the trademark ADRENALIN™ is approved. In some embodiments, the formulation of the invention may be administered to treat severe, acute hypotension.

The following examples further illustrate the invention but, of course, should not be construed as in any way limiting its scope.

Example 1

This example demonstrates a method for determining the stability of exemplary formulations comprising epinephrine, an organic acid, a tonicity agent, and water.

Samples containing epinephrine or a pharmaceutically acceptable salt thereof, a tonicity agent such as sodium chloride or dextrose, an organic acid such as citric acid, acetic acid, or lactic acid, and water, are adjusted to pH 2.6, 2.8, 3.0, 3.2, 3.4, 3.6, 3.8, or 4.0, filtered, filled into vials, sealed, and optionally terminally sterilized by autoclaving. The samples may be placed into stability chambers under room temperature (25° C.±2° C./60% RH±5% RH) or accelerated temperature (e.g., at 40° C.±2° C./75% RH±5% RH) storage conditions for 1-24 months.

The results for epinephrine content (API assay), S-isomer content, individual and total impurities, and/or nitrosamines may be determined using HPLC or LC-MS/MS.

To demonstrate stability, the pH, API assay, S-isomer, individual impurities, and/or nitrosamines may be compared among the exemplary epinephrine formulations.

Example 2

This example demonstrates the stability of exemplary formulations comprising epinephrine, an organic acid, a tonicity agent, an optional antioxidant, and an optional preservative.

Solutions containing 1.0 mg/mL epinephrine, 8.6 mg/mL NaCl, 0.5 mg/mL citric acid, anhydrous, 0.25 mg/mL sodium metabisulfite, optionally 1 mg/mL methylparaben, and water were adjusted to pH 3.2 using hydrochloric acid. The solutions were aseptically filtered and filled into single-dose clear glass vials (1 mL) or multi-dose amber glass vials (30-mL) and stoppered under aseptic conditions. The single dose vial (SDV) formulation did not contain methylparaben, while the multi dose vial (MDV) formulation contained methylparaben. The compounding process included sparging of the water to reduce dissolved oxygen, which involved bubbling of nitrogen during compounding, ensuring that not more than 2.0% oxygen exists in the headspace before capping, and using light protection techniques.

The samples were stored under room temperature conditions (25° C.±2° C./60% RH±5% RH) and then analyzed for pH and by HPLC for content of epinephrine, impurities, and S-isomer.

For assay and impurities, the HPLC conditions were as follows:
  Column: Phenomenex Luna Hexyl-Phenyl 3 µm, 4.6×250 mm Mobile Phase A: 52.5 mM monobasic potassium phosphate in water, pH 2.9

Mobile Phase B: acetonitrile:water (69:31)

Column temperature: 13° C.

Flow rate: 0.8 mL/min

Injection volume: 2 μL

Autosampler temperature: 5° C.

Detection UV: 225 nm

Separation mode: Gradient

Run time: 40 minutes

| Time (min) | % Mobile Ph. A | % Mobile Ph. B |
|---|---|---|
| 0 | 100 | 0 |
| 5 | 100 | 0 |
| 24 | 40 | 60 |
| 26 | 40 | 60 |
| 27 | 100 | 0 |
| 40 | 100 | 0 |

For S-isomer, the HPLC conditions were as follows.

Column: Shodex ORpak CDBS-453, 4.6×150 mm, 3 μm

Buffer: 0.75 g/L ammonium acetate in water, pH 4.0

Mobile Phase A: Buffer:Acetonitrile (99:1)

Mobile Phase B: 100% Isopropanol

Column temperature: 22° C.

Flow rate: 0.3 mL/min

Injection volume: 10 μL

Autosampler temperature: 10° C.

Detection UV: 280 nm

Separation mode: Gradient

Run time: 50 minutes

| Time (min) | % Mobile Ph. A | % Mobile Ph. B |
|---|---|---|
| 0 | 100 | 0 |
| 18 | 100 | 0 |
| 19 | 70 | 30 |
| 34 | 70 | 30 |
| 35 | 100 | 0 |
| 50 | 100 | 0 |

The results for pH, and the content of epinephrine (0 label claim) and the S-isomer, epinephrine sulfonate, adrenalone, and total impurities by peak area percent method following storage of samples from 3 lots of SDV and 3 lots of MDV at room temperature for 12, 18, or 24 months (M) are summarized in Tables 1 and 2.

TABLE 1

| | pH | | | Epinephrine Assay (%) | | | S-isomer (%) | | |
|---|---|---|---|---|---|---|---|---|---|
| | 12M | 18M | 24M | 12M | 18M | 24M | 12M | 18M | 24M |
| SDV1 | 3.5 | 3.5 | 3.5 | 105.8 | 105.3 | 103.1 | 1.7 | 4.6 | 3.1 |
| SDV2 | 3.5 | 3.5 | 3.5 | 106.2 | 105.5 | 103.7 | 1.7 | 4.5 | 3.1 |
| SDV3 | 3.5 | 3.5 | 3.5 | 106.8 | 105.3 | 103.3 | 1.7 | 4.4 | 2.9 |
| MDV1 | 3.2 | 3.1 | 3.1 | 107.1 | 105.2 | 103.2 | 3.0 | 6.4 | 5.8 |
| MDV2 | 3.3 | 3.3 | 3.2 | 107.2 | 105.2 | 103.1 | 2.1 | 5.2 | 4.1 |
| MDV3 | 3.3 | 3.2 | 3.2 | 107.4 | 105.0 | 103.3 | 2.2 | 5.2 | 4.4 |

TABLE 2

| | Epi. sulfonate (%) | | | Adrenalone (%) | | | Total Impurities (%) | | |
|---|---|---|---|---|---|---|---|---|---|
| | 12M | 18M | 24M | 12M | 18M | 24M | 12M | 18M | 24M |
| SDV1 | 4.1 | 5.8 | 7.2 | <0.10 | <0.10 | <0.10 | 4.1 | 5.8 | 7.3 |
| SDV2 | 4.0 | 5.7 | 7.0 | <0.10 | <0.10 | <0.10 | 4.0 | 5.7 | 7.0 |
| SDV3 | 4.7 | 5.8 | 7.4 | <0.10 | <0.10 | <0.10 | 4.7 | 5.8 | 7.4 |
| MDV1 | 3.8 | 5.4 | 6.8 | <0.10 | <0.10 | <0.10 | 3.8 | 5.4 | 6.8 |
| MDV2 | 4.1 | 5.8 | 7.3 | <0.10 | <0.10 | <0.10 | 4.1 | 5.8 | 7.3 |
| MDV3 | 4.0 | 5.8 | 7.4 | <0.10 | <0.10 | <0.10 | 4.0 | 5.8 | 7.4 |

These results demonstrate that exemplary epinephrine formulations of the invention remain stable following room temperature storage for up to two years.

Example 3

This example demonstrates the stability of exemplary formulations comprising epinephrine, an organic acid, a tonicity agent, an optional antioxidant, and an optional preservative with respect to nitrosamines.

Samples of SDV and MDV from Example 2 were maintained in storage under room temperature conditions (25° C.±2° C./60% RH±5% RH) for 50 months. The samples were analyzed for nitrosamines (N-nitroso-epinephrine or NNE) by LC-MS/MS, and the results are summarized in Table 3.

TABLE 3

| Sample | NNE concentration (per epinephrine) |
|---|---|
| SDV1 | 292 ppb (ng/g) |
| SDV2 | 374 ppb |
| SDV3 | 308 ppb |
| MDV1 | 270 ppb |
| MDV2 | 403 ppb |
| MDV3 | 261 ppb |

The results demonstrate that exemplary epinephrine formulations of the invention remain stable with respect to nitrosamine formation following room temperature storage for up to 50 months.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A pharmaceutical formulation comprising:
   epinephrine or a pharmaceutically acceptable salt thereof;
   citric acid;
   a tonicity agent;
   a sulfite antioxidant; and
   water;
   wherein the formulation has a pH of from 3.0 to 3.6 and is substantially free of a conjugate base of citric acid and an aminopolycarboxylic acid.

2. The formulation of claim 1, wherein the epinephrine or pharmaceutically acceptable salt thereof is present at a concentration of from 0.1 mg/mL to 10 mg/mL.

3. The formulation of claim 1, wherein the citric acid is present at a concentration of from 0.1 mg/mL to 25 mg/mL.

4. The formulation of claim 1, wherein a weight ratio of the epinephrine or pharmaceutically acceptable salt thereof to the citric acid is from 1:5 to 10:1.

5. The formulation of claim 1, wherein the sulfite antioxidant is sodium metabisulfite.

6. The formulation of claim 1, further comprising a preservative.

7. A pharmaceutical product comprising a container and the formulation of claim 1 contained therein.

8. The pharmaceutical product of claim 7, wherein the formulation has a pH drift of less than 0.3 pH units following storage of the product for at least 12 months at room temperature.

9. The pharmaceutical product of claim 7, wherein the formulation contains not more than 5% of total impurities and not more than 3% of S-epinephrine relative to the amount of epinephrine as determined by a peak area percent method by high-performance liquid chromatography after storage of the product for at least 12 months at room temperature.

10. A pharmaceutical formulation comprising:
    0.5-2.0 mg/mL of epinephrine or a pharmaceutically acceptable salt thereof;
    0.25-1.0 mg/mL of citric acid;
    a tonicity agent;
    a sulfite antioxidant; and
    water;
    wherein the formulation has a pH of from 3.0 to 3.6 and is substantially free of a conjugate base of citric acid and an aminopolycarboxylic acid.

11. The formulation of claim 10, wherein a weight ratio of the epinephrine or pharmaceutically acceptable salt thereof to the citric acid is from 1:1 to 4:1.

12. The formulation of claim 11, wherein the formulation has an osmolality of 260-320 mOsm/kg.

13. The formulation of claim 10, wherein the tonicity agent is sodium chloride.

14. The formulation of claim 10, wherein the sulfite antioxidant is sodium metabisulfite.

15. The formulation of claim 10, further comprising a paraben.

16. A pharmaceutical product comprising a container and the formulation of claim 10 contained therein.

17. The pharmaceutical product of claim 16, wherein the formulation has a pH drift of less than 0.3 pH units following storage of the product for at least 12 months at room temperature.

18. The pharmaceutical product of claim 16, wherein the formulation contains not more than 5% of total impurities and not more than 3% of S-epinephrine relative to the amount of epinephrine as determined by a peak area percent method by high-performance liquid chromatography after storage of the product for at least 12 months at room temperature.

19. A pharmaceutical formulation comprising:
    1.0 mg/mL of epinephrine or a pharmaceutically acceptable salt thereof;
    0.5 mg/mL of citric acid;
    8.6 mg/mL of sodium chloride;
    0.25 mg/mL of sodium metabisulfite; and
    water;
    wherein the formulation has a pH of from 3.0 to 3.6 and is substantially free of a conjugate base of citric acid and an aminopolycarboxylic acid.

20. The formulation of claim 19, further comprising 1 mg/mL of methylparaben.

21. A pharmaceutical product comprising a container and the formulation of claim 19 contained therein.

22. The pharmaceutical product of claim 21, wherein the formulation has a pH drift of less than 0.3 pH units following storage of the product for at least 12 months at room temperature.

23. The pharmaceutical product of claim 21, wherein the formulation contains not more than 5% of total impurities and not more than 3% of S-epinephrine relative to the amount of epinephrine as determined by a peak area percent method by high-performance liquid chromatography after storage of the product for at least 12 months at room temperature.

* * * * *